United States Patent [19]

Kinna

[11] Patent Number: 5,272,960
[45] Date of Patent: Dec. 28, 1993

[54] DISPENSING MACHINE

[75] Inventor: Robert N. Kinna, Bramley Green, United Kingdom

[73] Assignee: Mars G. B. Limited, Slough, England

[21] Appl. No.: 607,565

[22] Filed: Nov. 1, 1990

[30] Foreign Application Priority Data

Nov. 2, 1989 [GB] United Kingdom ............... 8924764

[51] Int. Cl.⁵ ..................... A47J 31/06; A47J 31/32
[52] U.S. Cl. ........................ 99/280; 99/287; 99/302 R; 222/82
[58] Field of Search ................. 99/279, 280, 281, 282, 99/283, 284, 287, 288, 295, 298, 299, 300, 302 R, 304, 305, 306, 307, 323; 222/146.5, 54, 82, 83.5, 88, 165; 426/483, 77; 383/67, 906

[56] References Cited

U.S. PATENT DOCUMENTS

| | | | |
|---|---|---|---|
| 4,577,080 | 3/1986 | Grossman | 99/300 |
| 4,644,855 | 2/1987 | Woolman et al. | 99/302 R |
| 4,738,378 | 4/1988 | Oakley et al. | 426/433 |
| 4,818,544 | 4/1989 | Seward | 426/77 |
| 4,886,674 | 12/1989 | Seward et al. | 426/77 |

FOREIGN PATENT DOCUMENTS 1371186  7/1964  France .

Primary Examiner—Philip R. Coe
Assistant Examiner—Reginald L. Alexander
Attorney, Agent, or Firm—Curtis, Morris & Safford

[57] ABSTRACT

A machine which dispenses beverages from sachets containing a beverage-producing material injects liquid into the sachet. A pressure-sensitive base seam of the sachet is opened by liquid pressure. To prevent the base seam opening explosively and spray solids or liquid away from the beverage receptacle directly below the sachet, a heat source is employed to weaken the seam prior to opening, so that it opens non-explosively by peeling in a controlled manner. The heat source can be internal (an initial volume of hot liquid at a pressure insufficient to break the seal) or external such as a radiant source, hot air or steam. Such a machine is particularly advantageous for dispensing hot chocolate.

9 Claims, 5 Drawing Sheets

DISPENSING MACHINE

BACKGROUND OF THE INVENTION

1. FIELD OF THE INVENTION

The present invention relates in general to the field of beverage dispensing machines, and in particular, in one embodiment, to hot drinks dispensing machines which utilize sachets of beverage-producing material through which a hot liquid passes.

2. DESCRIPTION OF RELATED ART

Prior art beverage dispensing machines which utilize packages of beverage-producing material are well known. In one variation of such known machines, they include a tank of hot water communicating with a water injector in the form of a hollow needle. A sachet of beverage-producing material is inserted into the machine by the user, the injector of the machine pierces a plastic nozzle carried in the top seam of the sachet and hot water is introduced into the sachet. The beverage is dispensed from the machine through the bottom of the sachet. The bottom seam of the sachet is secured by a pressure-sensitive adhesive. This seal is forced open by the pressure of fluid in the sachet. The beverage itself is formed by the hot water mixing with the beverage-producing material as it passes through the sachet. Such a system has been marketed by the assignee of this application, initially under the trade mark "Dimension 3", now "Flavia". Sachets and machines are described, for example, in EP-A-0179641 and GB-A-2122881, and in U.S. Pat. Nos. 4,886,674 and 4,738,378, respectively.

In general, ground coffee or leaf tea is supported upon filter material within the sachets. This arrangement ensures that when the bottom of the sachet opens due to the pressure of hot water in the sachet, the tea leaves or coffee grains are not forced out of the sachet and into the receptacle in which the beverage itself is being collected. Sometimes, however, the opening of the sachet is so explosive and vigorous that a small amount of beverage is sprayed from the bottom of the sachet away from the receptacle below the sachet so that not all of the beverage enters the receptacle. This is clearly undesirable.

Although the aforementioned prior art dispensing machines work satisfactorily when producing coffee or tea, subject to any initial spraying of the beverage as the sachet opens being inexcessive, the machines are less satisfactory for dispensing certain other beverages, such as hot chocolate.

Hot chocolate, for example, is formed by dispersing a powder in a liquid rather than using an infusion technique as in the case of coffee or tea. Accordingly, the hot chocolate powder must be able to pass out of the sachet as the beverage is produced. If a prior art machines is used, this results in the powder as well as the liquid being sprayed out of the bottom of the sachet as the sachet opens explosively. This powder is wasted and causes a mess. Powder can also be ejected into the receptacle insufficiently dispersed in the hot liquid.

In another known variation of machines which produce beverages from packages with pressure-sensitive seals, a sachet with such a seal is compressed externally to rupture the seal and express the sachet contents into a waiting receptacle. Such sachets have typically contained fruit juice or cola concentrates, which are mixed with liquid (typically water-gaseous or non-gaseous as the case may be) dispensed separately into the receptacle. If the sachet opens explosively, as with the first-mentioned version of machines, the expelled product can be ejected vigorously—which is less than satisfactory.

SUMMARY OF THE INVENTION

The present invention has been devised to overcome the problem of spraying beverage (in the case of tea or coffee) or beverage liquid or powder (in the case of hot chocolate), liquid concentrates and the like) when the bottom of a package used in a beverage machine is forced open by the pressure increase within the package itself.

The present invention resides in the use of a heating medium which heats the pressure-sensitive seal of the package when it is positioned in the dispensing machine, such that the adhesive strength of the seal is reduced to enable the bottom of the package to open more easily and smoothly. In this way, the package does not open explosively. A further advantage of this invention is that the opening places less stress on the package, thus reducing the likelihood of other seams in the package rupturing unwantedly.

According to the present invention there is provided a beverage dispensing machine comprising means for receiving a package containing a beverage-producing product, means for increasing the pressure within the package so that the inside pressure is greater than the outside pressure to cause a pressure-sensitive seal of the package to rupture and enable material from the package to be released to assist in forming, or to form, a beverage, characterized in that heat is applied to the seal to reduce the adhesive strength of the seal whereby the pressure required to open the seal is reduced and the seal opens non-explosively by peeling open in a controlled manner.

According to the invention, there is also provided a method of dispensing a beverage from a sealed package containing a beverage-producing product, with the package comprising a pressure-sensitive seal. This method comprises increasing the pressure within the package so that the inside pressure is greater than the outside pressure to cause the seal to rupture and enable material from the package to be released to assist in forming, or to form, a beverage. This is accomplished by applying heat to the seal to reduce the adhesive strength of the seal whereby the pressure required to open the seal is reduced and the seal opens non-explosively by peeling open in a controlled manner.

In one preferred embodiment of the invention, the machine comprises a liquid supply means for supplying liquid into the package, the liquid supply means constituting the pressure increasing means. Preferably, a control means allows an initial quantity of hot liquid to be introduced into the package, to dwell there, heat and hence weaken the seal before a further volume of liquid is introduced to increase the pressure in the package and open the seal.

In an alternative embodiment of the invention, heat is applied to the seal externally. Such an external heat source may be provided by a radiant source such as a hot wire or a halogen bulb, a hot air blower or any other suitable means. When an external heat source is employed, the liquid injected into the package need not necessarily be hot itself. The invention can thus be employed for providing cold beverages.

In another preferred embodiment of the invention, the machine includes a tank for hot water, and in use steam from the tank is used to heat and hence weaken the seal at the bottom of the package.

Preferably an activator triggers the heat supply when a package is inserted in the machine.

It is also preferable that the heat supply is only activated for a preset time period and is then deactivated.

It will of course be appreciated that any form of heat supply could be used to heat the seal at the bottom of a sachet in the machine, and hence reduce the adhesive strength of the seal so that the sachet does not explode open when the hot liquid is pumped into the sachet from above.

In a further embodiment, the pressure increasing means is a means for compressing the package externally, such as a piston or one of a pair of rollers which squeeze the package.

The beverage-producing product in the package may be an infusion material such as ground coffee or leaf tea, a solid to be dispersed in liquid such as chocolate powder or soup powder, or a liquid such as a fruit juice or cola concentrate. It may constitute just one component or precursor of the final beverage, or it may constitute the complete beverage itself.

Specific embodiments of the present invention are now described purely by way of example with specific reference to the type of machines dispensing beverages from sachets with nozzles, as described in EP-A-0179641, GB-A-2122881, U.S. Pat. Nos. 4,886,674 and 4,738,378, the disclosures of which are incorporated herein by reference.

DESCRIPTION OF THE PREFERRED EMBODIMENTS

Figure 1:
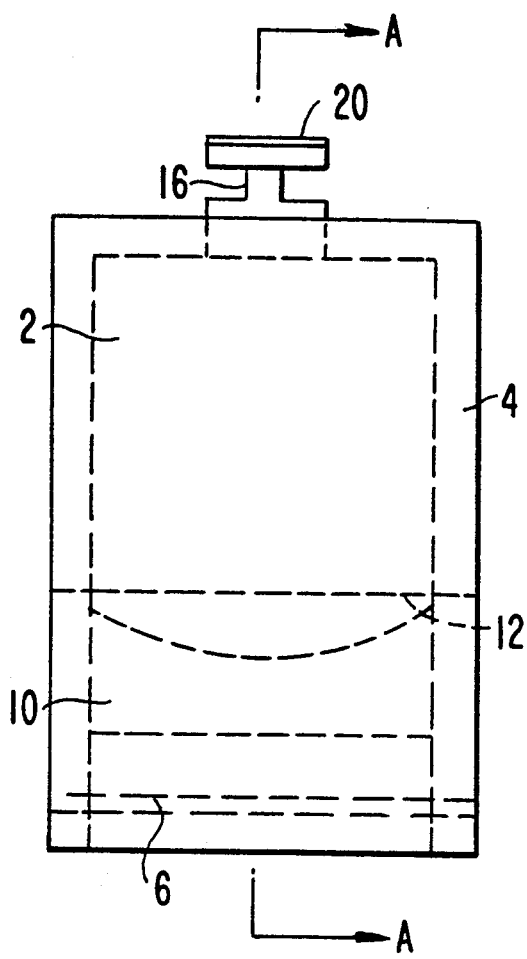
FIGS. 1-3 show a sachet of the type which can be used in the present invention.
Figure 2:
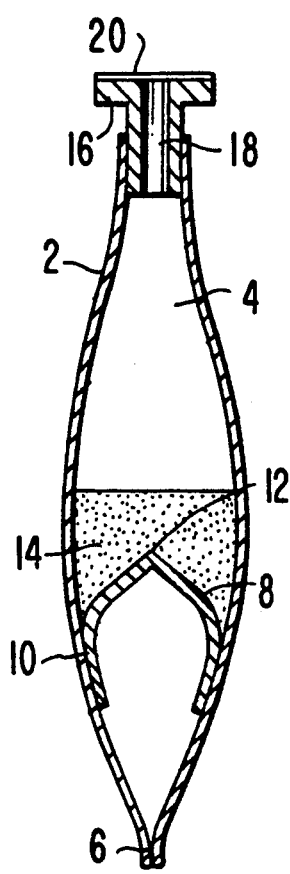
Figure 3:
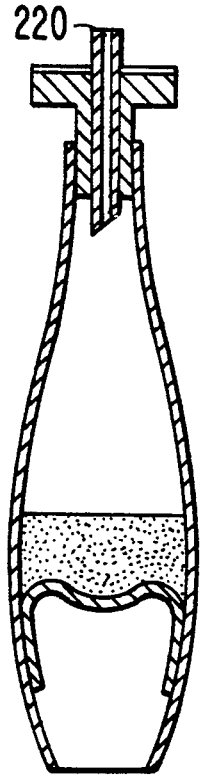

Referring to FIGS. 1 to 3 the sachet shown consists of two sheets of a water- and air-impermeable sheet material 2 welded together at seams 4. The bottom seam 6 is formed with a pressure sensitive adhesive applied between the long dashed lines shown in FIG. 1. Within the sachet is an inverted V-shaped sheet of web material 8 which is a laminar sheet of filter material and which is adhered to the sheet material 2 on each side over an area 10 which is best described as rectangular, but with the top side of the rectangle being curved inwardly and downwardly rather than straight. The filter material 8 is provided with a center fold 12 whose apex points upwardly so that sheet material 2 and filter material 8, when bonded together, form, in the section shown in FIG. 2, a W-shape. The filter material 8 supports a beverage-providing product 14 and the top seam of the sachet incorporates a flanged nozzle 16 whose delivery channel 18 is obturated by a layer of a sheet barrier material 20.

The sheet material 2 is a multilayer laminate such as (from the outside to the inside) polyester, aluminum foil, polyester, polypropylene. The filter material 8 is a laminate of melt blown polypropylene sandwiched between layers of non-woven spun-bonded polypropylene. The pressure-sensitive adhesive is a pressure-sensitive lacquer which is sold by E.I. du Pont de Nemours under the trademark "Surlyn".

In use as shown in FIG. 3, hot water is introduced into the sachet through a hollow injector 220 which pierces barrier material 20 and enters delivery channel 18. The water pressure causes the filter material to evert about fold 12 to provide a generally flat plane or downwardly convex filter bed 24. The eversion effect assists in the rupture of the pressure-sensitive seal of seam 6. Because of the geometrical shape of area 10, the bottom opening to the sachet is generally elliptical and is formed in a reproducible manner from sachet to sachet.

Figure 4:
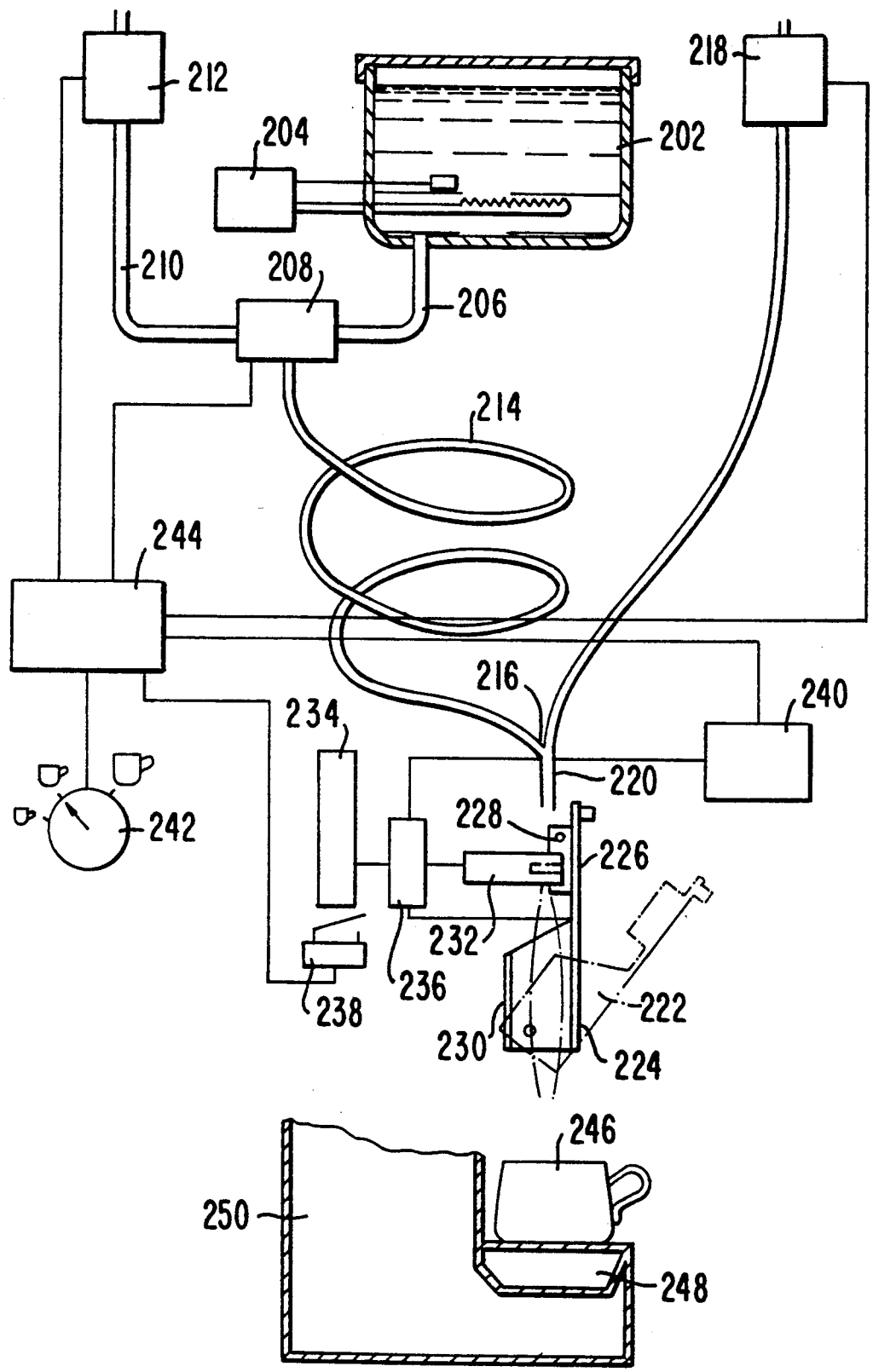
FIG. 4 shows one embodiment of the beverage dispensing machine according to the present invention.
Figure 5:
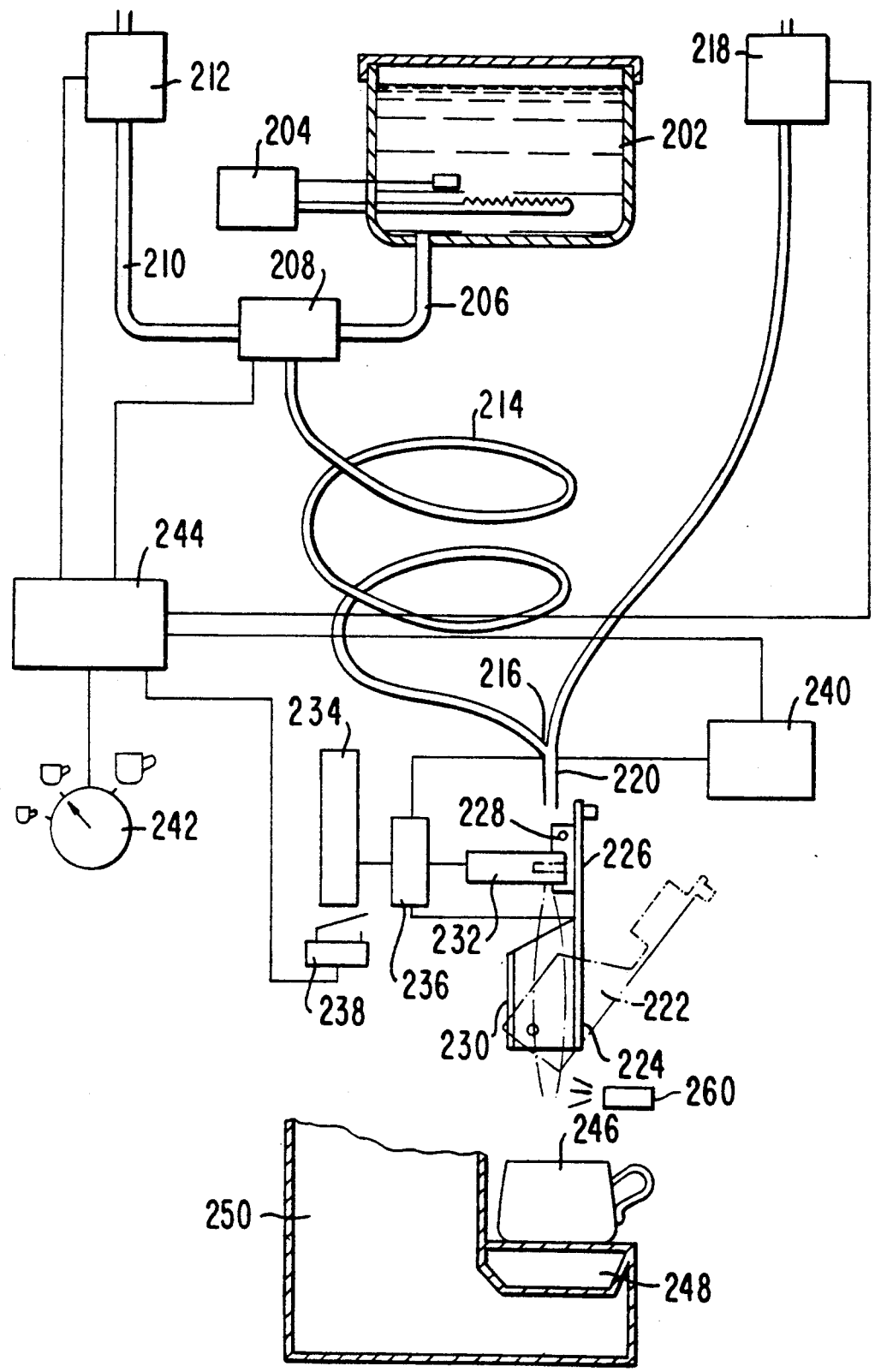
FIG. 5 shows another embodiment illustrating a heat source.
Figure 6:
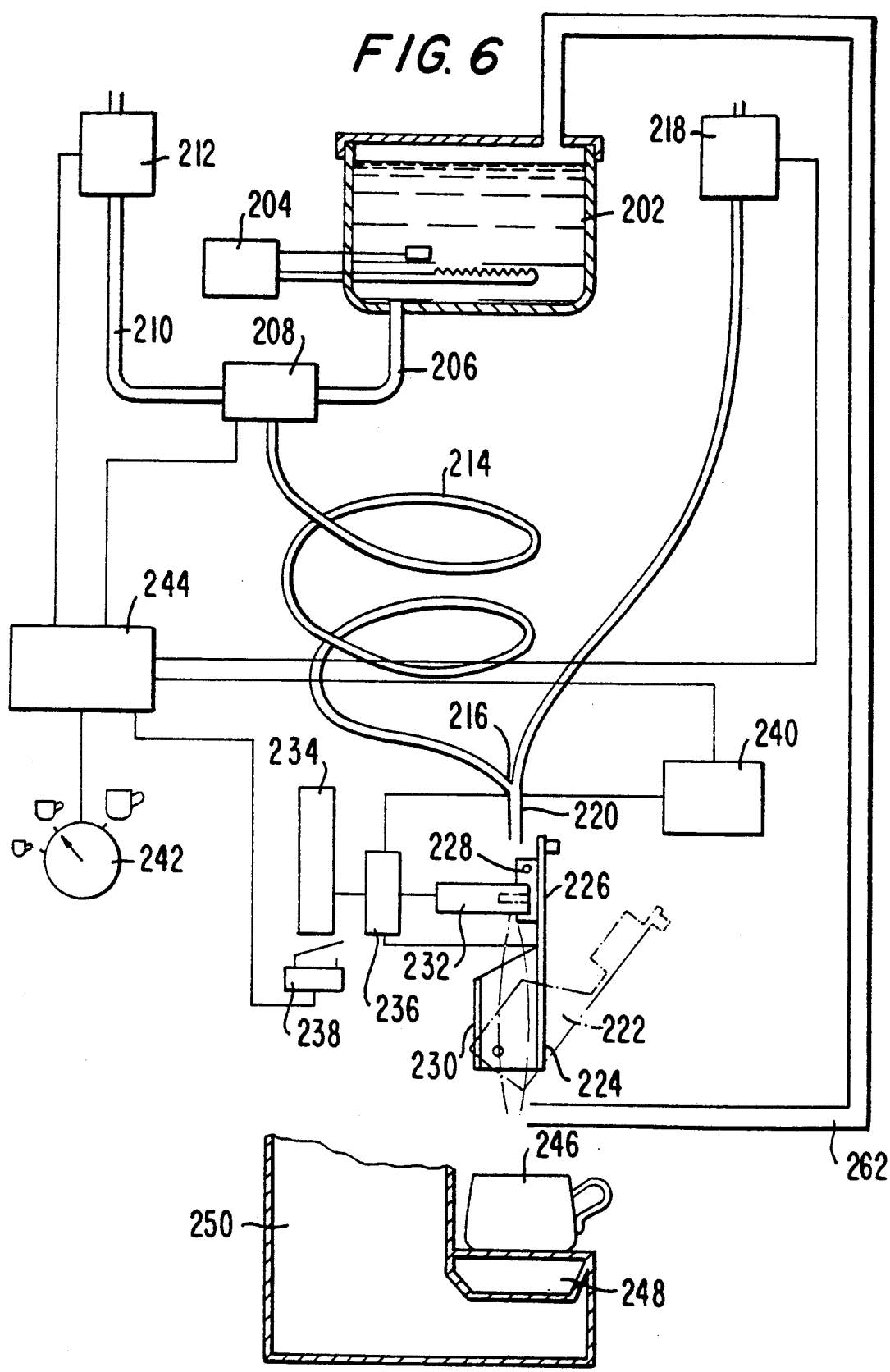
FIG. 6 shows another embodiment of the invention.

Referring to FIGS. 4-6 the apparatus comprises a water reservoir 202 containing a heater/thermostat assembly 204 sufficient to maintain the water at about 96° C. A water outlet 206 leads to an electrically-operable three-port valve 208. A second inlet 210 to the latter leads from an air pump 212 such that either air or water is delivered downwardly into delivery tube 214. The latter terminates at one branch of a Y-junction 216, the other upper branch of which leads from an electrically-operable air venting valve 218. The lower branch of junction 216 terminates in an injector 220 having a knife-edged exposed lower opening to facilitate piercing of the covering on a sachet nozzle. (The sachet is shown in dotted from in FIGS. 4-6).

A hinged door 222 is supported such that it normally rests open (shown in dashed lines in FIGS. 3-4) and comprises a front wall 224 carrying a sachet support member 226 and door latching pin 228. A back wall 230 separate from the front wall and hinged to side walls of the door extends upwardly from the foot of the door and spaced from the front wall 224. There is an open base to the door between the front and back walls and the back wall extends only partially to the height of the front wall. The door 222 is easily removable from its hinges to enable it to be conveniently cleaned.

A claw support 232 is normally disposed immediately below injector 220 but in use is urged upwardly by depression of an actuator arm 234. The upwardly-urged claw support 232 and depressed actuator arm 234 are latched in this position by a latch mechanism 236. The latter also cooperates with latching pin 228 to lock the door when closed. A microswitch 238 is disposed adjacent actuator arm 234 and is closed thereby when the arm 234 is depressed. The latching mechanism is connected to, and released by operation of, a solenoid 240.

A beverage size selector knob 242 is coupled to an electromechanical cam timer 244 which controls the operation of three-port valve 208, air pump 212, air venting valve 218, and solenoid 240.

A suitable container 246 for receipt of the desired beverage is placed immediately below door 222 and injector 220, supported upon a drip tray 248. Behind drip tray 248 is disposed a waste sachet receipt bin 250.

The valves, pump, heater/thermostat, solenoid, and cam timer components are standard and require no further description.

In use, a sachet containing an infusion-type beverage-providing material is inserted and door 222 is closed. Actuator arm 234 is depressed which closes microswitch 238 to actuate cam timer 244 into a programmed sequence of operation of the components it controls and instructs the control means to deliver a preset quantity of hot water to the sachet in separate preset volumes.

In the embodiment shown in FIG. 4, the injector 220 is lowered and pierces the plastic nozzle 16 of the sachet to enter the sachet itself. A volume of hot water is then introduced into the sachet itself through the nozzle 16 so that the sachet is relatively full but not under high pressure. This water is then allowed to dwell in the sachet for a predetermined length of time so that heat is transferred to the bottom seal of the sachet such that the adhesive strength of the seal is reduced. Further, during this time, the beverage-providing material is in contact with the hot water and the water absorbs flavor therefrom.

When the predetermined time period has elapsed, a second volume of hot water is introduced into the sachet at a rate such that the bottom seal 6 of the sachet peels open controllably due to the weakness of the adhesive seal, and hence does not explode open with a retort as in the prior art case. The hot beverage then flows out of the bottom of the sachet into a receptacle, such as a mug or cup 246. More hot water can be introduced into the sachet as required to obtain the most efficient use of the beverage-producing material in the sachet itself.

Clearly, there is an optimum time period for the initial volume of hot water to be within the sachet before the bottom seal of the sachet is opened, and also there is an optimum delivery rate of the second volume of hot water which forces the bottom seal to peel open. These optimum times and delivery rates are determined by the adhesive strength and nature of the bottom seal of the sachet itself, as well as the initial temperature of the water.

Figure 5A:
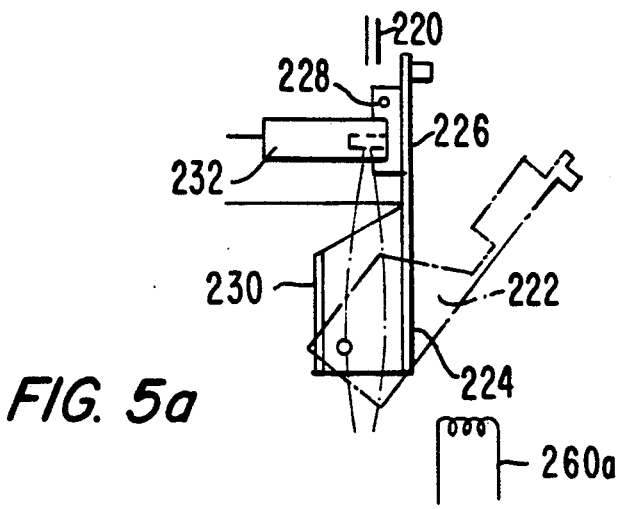
FIGS. 5a, 5b and 5c are fragmentary views similar to FIG. 5 showing particular heat sources.
Figure 5B:
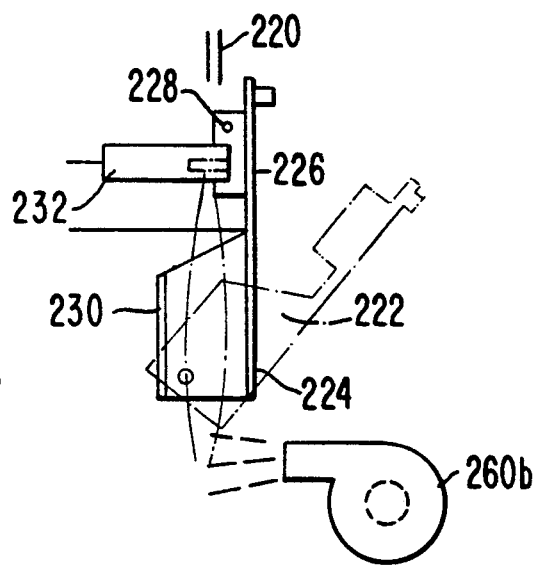
Figure 5C:
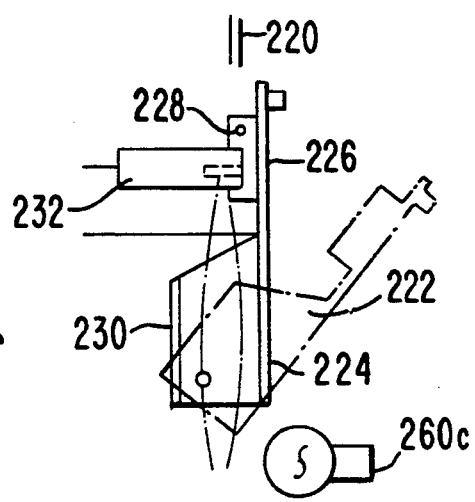

In alternative embodiments shown in FIGS. 5, 5a, 5b, 5c and 6, where like parts have like reference numbers, an external heat source 260 is provided in the beverage dispensing machine at a position where heat can be readily applied to the bottom seal 6 of a sachet inserted in the machine. In the embodiment of FIG. 5a, the heat source 260a is a hot wire, in the embodiment of FIG. 5b the heat source is; a hot air blower and in the embodiment of FIG. 5c the heat source is; a halogen bulb. Alternatively, as shown in 6, the external heat source may be a supply of steam from the hot water tank directed through steam passage tube 262 to an area adjacent the bottom seal 6 of the sachet.

On insertion of a sachet into the machine, an activator, such as actuator 234, initiates power to the particular heat source being used which heats the seal at the bottom of the sachet and hence reduces the adhesive strength of the seal. Hot water is introduced into the sachet as in the previous embodiment of the invention. After a predetermined period of time, sufficient water has been introduced into the sachet to pressurize the bottom seal of the sachet which then peels open due to the reduction in adhesive strength of the seal. A this time, the heat source is deactivated.

It will of course be understood that the present invention has been described above purely by way of example, and that modifications in detail can be made within the scope of the invention as claimed.

What is claimed is:

1. A beverage dispensing machine for providing a beverage by introducing an aqueous medium into an initially sealed package containing a beverage-producing product, said package including a pressure-sensitive adhesive seal, means for increasing the pressure within the package so that the inside pressure is greater than the ourside pressure to cause said pressure-sensitive seal of the package to rupture and enable material from the package to be released to make a beverage, and means for applying heat to the seal of said package from an external source to reduce the adhesive strength of the seal whereby the pressure required to open the seal is reduced causing the seal to open non-explosively by peeling open in a controlled manner.

2. A beverage dispensing machine according to claim 1, wherein said heat applying means comprises a hot wire.

3. A beverage dispensing machine according to claim 1, which includes a tank for hot water and wherein the heat applying means comprises means for applying steam from the tank to heat the pressure-sensitive seal.

4. A beverage dispensing machine according to any one of claims 2 to 3, which comprises activator means for triggering the heat applying means when a package is inserted in the machine.

5. A beverage dispensing machine according to claim 4, wherein the activator means is only activated for a preset time period and is then de-activated.

6. A beverage dispensing machine according to claim 1 which additionally comprises liquid supply means for introducing liquid into the package, said liquid supply means constituting said pressure increasing means.

7. A beverage dispensing machine according to claim 6 including receiving means for receiving a nozzle of said package and wherein said liquid supply means is arranged to introduce liquid into the package through said nozzle.

8. A beverage dispensing machine according to claim 1 wherein said heat applying means comprises a halogen bulb.

9. A beverage dispensing machine according to claim 1 wherein said heat applying means comprises a hot air blower.

* * * * *

UNITED STATES PATENT AND TRADEMARK OFFICE
CERTIFICATE OF CORRECTION

PATENT NO. : 5,272,960
DATED : December 28, 1993
INVENTOR(S) : Robert N. Kinna

It is certified that error appears in the above-identified patent and that said Letters Patent is hereby corrected as shown below:

```
Claim 1, column 6, line 14, "ourside" should read
--outside--.
```

Signed and Sealed this

Fourteenth Day of June, 1994

Attest:

BRUCE LEHMAN

*Attesting Officer*   *Commissioner of Patents and Trademarks*